United States Patent
Takahashi

(10) Patent No.: US 8,762,029 B2
(45) Date of Patent: Jun. 24, 2014

(54) CONTROL DEVICE FOR INTERNAL COMBUSTION ENGINE WITH SUPERCHARGER

(75) Inventor: Kiyonori Takahashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/812,586

(22) PCT Filed: Feb. 2, 2011

(86) PCT No.: PCT/JP2011/052141
§ 371 (c)(1),
(2), (4) Date: Jan. 28, 2013

(87) PCT Pub. No.: WO2012/105010
PCT Pub. Date: Aug. 9, 2012

(65) Prior Publication Data
US 2013/0304355 A1   Nov. 14, 2013

(51) Int. Cl.
*F02D 23/00* (2006.01)
*F02D 41/00* (2006.01)
*F02D 23/02* (2006.01)

(52) U.S. Cl.
CPC ........ *F02D 41/0007* (2013.01); *F02D 41/0002* (2013.01); *F02D 2200/00* (2013.01); *F02D 2200/0402* (2013.01); *F02D 2200/0404* (2013.01)
USPC .......................................... 701/103; 123/399

(58) Field of Classification Search
CPC ... F02D 41/0007; F02D 41/0002; F02D 9/00; F02D 2200/00; F02D 2200/0402; F02D 2200/0404
USPC .......... 701/101–103, 110, 114, 115; 123/350, 123/352, 361, 399, 403, 376
See application file for complete search history.

(56) References Cited

U.S. PATENT DOCUMENTS

| | | | | |
|---|---|---|---|---|
| 5,906,185 A | * | 5/1999 | Ishida et al. | 123/399 |
| 6,397,814 B1 | * | 6/2002 | Nagaishi et al. | 123/348 |
| 6,832,136 B2 | * | 12/2004 | Huber et al. | 701/1 |
| 7,949,459 B2 | * | 5/2011 | Yoshikawa et al. | 701/103 |

FOREIGN PATENT DOCUMENTS

| | | |
|---|---|---|
| JP | A-2005-188335 | 7/2005 |
| JP | A-2006-274993 | 10/2006 |
| JP | A-2007-205194 | 8/2007 |
| WO | WO 2007/088761 A1 | 8/2007 |

* cited by examiner

*Primary Examiner* — Mahmoud Gimie
(74) *Attorney, Agent, or Firm* — Oliff PLC

(57) ABSTRACT

An object of the present invention is to prevent hunting of a throttle in a region in which a throttle upstream pressure and a throttle downstream pressure become substantially equal to each other in an internal combustion engine with a supercharger. For this purpose, a control device for an internal combustion engine with a supercharger provided by the present invention processes a signal of a throttle opening which is calculated by using a formula of throttling when a ratio of the throttle upstream pressure and the throttle downstream pressure has a value close to 1, and controls an operation of the throttle with the throttle opening the change speed of which is lessened as a target throttle opening.

8 Claims, 1 Drawing Sheet

CONTROL DEVICE FOR INTERNAL COMBUSTION ENGINE WITH SUPERCHARGER

TECHNICAL FIELD

The present invention relates to a control device which is a control device for an internal combustion engine with a supercharger, and calculates a target throttle opening for realizing a target intake air quantity by calculation using a physical model expressing a behavior of air which flows in an intake passage.

BACKGROUND ART

In general, an intake air quantity of an internal combustion engine can be regulated with an intake pipe pressure. An intake pipe pressure is determined by a flow rate of air which passes through a throttle. A throttle passing flow rate is determined by a differential pressure of an upstream pressure and a downstream pressure of a throttle, and an opening (that is, an opening area) of the throttle. The physical model which is derived from such a relation is formula (1) described as follows. Formula (1) is a formula of throttling which shows a relation of a throttle passing flow rate $m_t$, a throttle opening TA, a throttle upstream pressure $P_{ac}$ and a throttle downstream pressure $P_m$. K in formula (1) is a coefficient including a flow rate coefficient, B is an opening area at the time of the throttle opening being TA, $\phi$ is a function (pressure ratio term) of a pressure ratio $P_m/P_{ac}$.

[Formula 1]

$$m_t = K * B(TA) * \Phi\left(\frac{P_m}{P_{ac}}\right). \quad \text{formula (1)}$$

By modifying the above described formula of throttling, formula (2) described as follows can be obtained. According to the formula (2), the throttle opening TA which is a target can be calculated from the throttle passing flow rate $m_t$ and the pressure ratio $P_m/P_{ac}$. The method which calculates a target throttle opening by calculation using such a physical model is a conventionally known method as is described in, for example, Japanese Patent Laid-Open No. 2007-205194.

[Formula 2]

$$TA = B^{-1}\left(\frac{m_t}{K * \Phi(P_m/P_{ac})}\right) \quad \text{formula (2)}$$

The calculation method of the target throttle opening using formula (2) also can be applied to an internal combustion engine with a supercharger. In this case, the pressure ratio $P_m/P_{ac}$, which is one of parameters, is influenced by the throttle upstream pressure $P_{ac}$ which is determined by the rotational speed of a compressor, that is, a supercharging pressure. As a setting method of a supercharging pressure, there are several methods, and if the highest priority is given to fuel economy, the throttle is opened to be as close to full throttle as possible, and the supercharging pressure and the throttle downstream pressure, that is the intake pipe pressure, are preferably set to be substantially equal to each other.

However, in the situation in which the difference between the upstream pressure and the downstream pressure of the throttle is small, the throttle sometimes causes hunting when the supercharging state by the supercharger changes. This is because a relation as shown in FIG. 4 is established between the pressure ratio term $\phi$ and the pressure ratio $P_m/P_{ac}$ of formula (2). As shown in the drawing, in the region in which the differential pressure between the upstream pressure and the downstream pressure of the throttle is small, that is, in the region in which the value of the pressure ratio $P_m/P_{ac}$ is close to 1, the value of the pressure ratio term $\phi$ changes sharply with respect to a very small change of the pressure ratio $P_m/P_{ac}$. As a result, the calculated value of the throttle opening oscillatorily changes, and hunting of the throttle occurs. Such hunting of a throttle can occur when the throttle is not opened close to full throttle. This is because since change of a supercharging pressure has a lag, the upstream pressure and the downstream pressure of the throttle sometimes become equal to each other transiently.

CITATION LIST

Patent Literature

Patent Literature 1: Japanese Patent Laid-Open No. 2007-205194
Patent Literature 2: Japanese Patent Laid-Open No. 2006-274993
Patent Literature 3: Japanese Patent Laid-Open No. 2005-188335

SUMMARY OF INVENTION

The present invention has an object to prevent hunting of a throttle in a region in which a throttle upstream pressure and a throttle downstream pressure become substantially equal to each other in an internal combustion engine with a supercharger. In order to attain such an object, the present invention provides a control device for an internal combustion engine with a supercharger as follows.

A control device for an internal combustion engine provided by the present invention calculates a throttle passing flow rate which is necessary for realization of a target intake air quantity, and calculates a throttle opening necessary for realization of the throttle passing flow rate by using a formula of throttling. For the calculation, a throttle upstream pressure which is a pressure of air in an intake passage from a compressor to a throttle, and a throttle downstream pressure which is a pressure of air in the intake passage from the throttle to an intake valve are respectively acquired. The present control device executes calculation of the throttle opening by the formula of throttling with a ratio of the throttle upstream pressure and the throttle downstream pressure which are acquired as a parameter.

The present control device determines a target throttle opening based on the throttle opening calculated by using the formula of throttling, and controls an operation of the throttle in accordance with the target throttle opening. However, when all of predetermined lessening conditions are satisfied, the control device processes a signal of the throttle opening which is calculated by using the formula of throttling, lessens the change speed thereof, and determines the throttle opening the change speed of which is lessened as the target throttle opening. The lessening conditions include that a value of the ratio of the throttle upstream pressure and the throttle downstream pressure which are acquired is close to 1, in more detail, magnitude of a deviation of a value of the pressure ratio with respect to "1" is not larger than a predetermined value. That is to say, the present control device intentionally suppresses a change in the throttle opening in a region in which a value of a pressure ratio term of the formula of throttling changes sharply with respect to a very small change of the pressure ratio. Thereby, hunting of the throttle in a region in which the throttle upstream pressure and the throttle downstream pressure become substantially equal to each other is prevented. Meanwhile, if the lessening conditions are not satisfied, the throttle opening which is calculated by using the formula of throttle is directly determined as a target throttle opening. More specifically, in a region in which hunting of the throttle hardly occurs, intentional suppression of the change of the throttle opening is not performed. Thereby, by appropriate control of the throttle opening, the realization precision of the target intake air quantity can be kept high.

The aforementioned lessening conditions may further include that a change amount per predetermined time of the target intake air quantity is not more than a predetermined value. More specifically, even when the value of the aforementioned pressure ratio is close to 1, if the target intake air quantity changes sharply, the throttle opening which is calculated by using the formula of throttling may be directly determined as the target throttle opening. If the target intake air quantity sharply changes, the target throttle opening also changes sharply in one direction in accordance with it. Accordingly, in this case, even if the change speed of the throttle opening is not lessened, hunting of the throttle hardly occurs. Further, the change speed of the throttle opening is not lessened, whereby the target intake air quantity which sharply changes can be realized with excellent precision.

As means that lessens the change speed of the throttle opening, a low-pass filter can be used. By processing the signal of the throttle opening which is calculated by using the formula of throttling by a low-pass filter, the change speed of the throttle opening can be lessened. Further, by regulating a time constant of the low-pass filter, the degree of lessening of the change speed of the throttle opening can be changed. Accordingly, if compatibility of prevention of hunting of the throttle and realization precision of the target intake air quantity is aimed at, the time constant of the low-pass filter is made smaller as the change amount per predetermined time of the target intake air quantity is larger.

DESCRIPTION OF EMBODIMENT

An embodiment of the present invention will be described with reference to the drawings.

A control device of the present embodiment is applied to an internal combustion engine with a supercharger. An internal combustion engine which is an object to which the present control device is applied is a four-cycle reciprocal engine which can control torque by regulation of an air quantity by a throttle. A supercharger which is provided in the internal combustion engine in the present embodiment is a turbo type supercharger which drives a compressor disposed in an intake passage by rotation of a turbine which is disposed in an exhaust passage.

The present control device is realized as one function of an ECU which is included in the internal combustion engine. In more detail, a program which is stored in a memory is executed by a CPU, and thereby, the ECU functions as a control device. When the ECU functions as the control device, the ECU calculates a target throttle opening for realizing a target intake air quantity by using a calculation model which is programmed, and controls the operation of the throttle in accordance with the target throttle opening.

Figure 1:
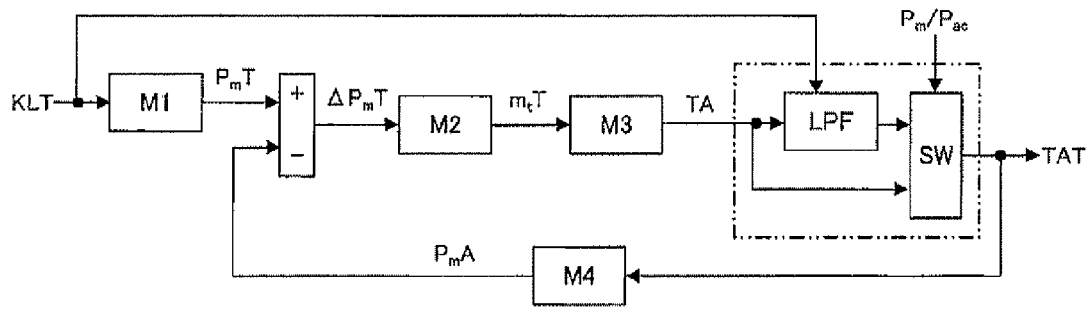
FIG. 1 is a functional block diagram showing a throttle opening calculation model which is used in a control device of an embodiment of the present invention.

FIG. 1 is a functional block diagram showing a throttle opening calculation model which is used in the present embodiment. The throttle opening calculation model includes an intake valve inverse model M1, an intake pipe inverse model M2, a throttle inverse model M3 and an intake system model M4 which are sub models. Further, the throttle opening calculation model includes a low-pass filter LPF and a switch SW. Hereinafter, a content of each element included in the throttle opening calculation model of the present embodiment will be described. Of each element, the contents of the sub models M1, M2, M3 and M4 are known, and therefore, only the outlines thereof will be shown here.

The intake valve inverse model M1 is a model based on an experiment in which a relation of an intake air quantity and an intake pipe pressure is investigated. By an empirical rule which is obtained by the experiment, the relation of the intake air quantity and the intake pipe pressure is approximated by a straight line in the intake valve inverse model M1. By inputting a target intake air quantity KLT into the intake valve inverse model M1, an intake pipe pressure $P_{mt}T$ for realizing it is calculated.

The intake pipe inverse model M2 is a physical model which is constructed based on the conservation law concerning the air in the intake pipe, more specifically, the energy conservation law and the flow rate conservation law. In the intake pipe inverse model M2, the relation of the flow rate of the air which passes through the throttle and the intake pipe pressure is expressed by a mathematical formula. By inputting a differential pressure $\Delta P_m T$ between the intake pipe pressure $P_{mt}T$ which is a target and a present estimated intake pipe pressure $P_m A$ into the intake pipe inverse model M2, a throttle passing flow rate $m_t T$ for realizing it is calculated.

The throttle inverse model M3 is a calculation model which expresses a relation of the throttle passing flow rate and the throttle opening by a mathematical formula. More specifically, the aforementioned formula (2), that is, the formula of throttling is used as the throttle inverse model M3. The pressure ratio $P_m/P_{ac}$ which is one of the parameters of formula (2) is the ratio of a supercharging pressure $P_{ac}$ which is a throttle upstream pressure and an intake pipe pressure $P_m$ which is a throttle downstream pressure. The supercharging pressure $P_{ac}$ and the intake pipe pressure $P_m$ which are used for calculation of the pressure ratio $P_m/P_{ac}$ may be actual measured values or calculated values by using models. In the throttle inverse model M3, the throttle passing flow rate $m_t T$ which is a target is inputted, and the value of the pressure ratio $P_m/P_{ac}$ which is a parameter is inputted, whereby, a throttle opening TA for realizing the target throttle passing flow rate $m_t T$ is calculated.

The intake system model M4 is a calculation model which is obtained by integrating respective forward models of the aforementioned intake pipe inverse model M2 and throttle inverse model M3. By inputting a throttle opening TAT which is a target into the intake system model M4, an estimated value of the intake pipe pressure $P_mA$ which is realized by the target throttle opening TAT is calculated. The estimated intake pipe pressure $P_mA$ which is calculated with the intake system model M4 is used for calculation of a differential pressure $\Delta P_mT$ from the intake pipe pressure $P_{mt}T$ which is calculated by the intake valve inverse model M1.

The low-pass filter LPF and the switch SW are used for determination of the target throttle opening TAT. A signal of the throttle opening TA which is outputted from the throttle inverse model M3 is duplicated into two signals, and one of the signals of the throttle opening TA is passed through the low-pass filter LPF and thereafter, is inputted into the switch SW. The other signal of the throttle opening TA is directly inputted into the switch SW. The low-pass filter LPF is, for example, a first-order lag filter, and is provided for lessening the change speed of the throttle opening TA. The switch SW selects any one of the signals of the throttle opening TA which are inputted, that is, any one of the throttle opening TA the change speed of which is lessened and the original throttle opening TA. Subsequently, the throttle opening TA which is selected by the switch SW is determined as the final target throttle opening TAT.

The switch SW is configured to perform switching of signals based on the aforementioned pressure ratio $P_m/P_{ac}$. In the present embodiment, it is determined whether or not the current region is the one in which the value of the pressure ratio term of formula (2) significantly changes with respect to a very small change of the pressure ratio Pm/Pac, according to whether or not the magnitude of the deviation of the value of the pressure ratio $P_m/P_{ac}$ with respect to "1" is not more than a predetermined value (for example, 0.05). When the magnitude of the deviation of the value of the pressure ratio $P_m/P_{ac}$ with respect to "1" is not more than the predetermined value, the switch SW selects the throttle opening TA which is processed by the low-pass filter LPF, and determines it as the final target throttle opening TAT. Conversely, when the magnitude of the deviation of the value of the pressure ratio $P_m/P_{ac}$ with respect to "1" exceeds the predetermined value, the switch SW selects the original throttle opening TA which is outputted from the throttle inverse model M3, and determines it as the final target throttle opening TAT.

Figure 2:
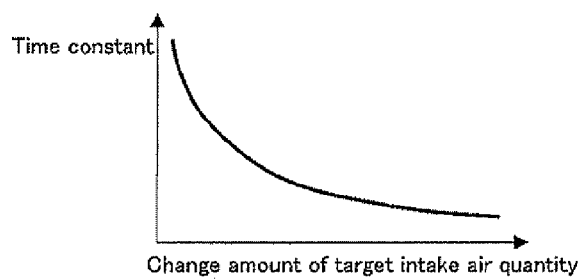
FIG. 2 is a diagram for explaining a method for determining a time constant of a low-pass filter in the throttle opening calculation model of the embodiment of the present invention.

The low-pass filter LPF is configured to be able to change a time constant thereof. FIG. 2 is a diagram for explaining the method for determining the time constant of the low-pass filter LPF. As shown in the drawing, the time constant is changed in accordance with a change amount per predetermined time (for example, a time step of the control device) of the target intake air quantity KLT. In more detail, as the change amount per predetermined time of the target intake air quantity KLT is larger, the time constant of the low-pass filter LPF is made smaller. The signal of the throttle opening TA has the change speed thereof lessened by passing through the low-pass filter LPF, and the lessening degree is determined by the value of the time constant. If the time constant of the low-pass filter LPF is large, the change speed of the throttle opening TA is significantly lessened. Conversely, if the time constant of the low-pass filter LPF is small, the change speed of the throttle opening TA is only lessened slightly. Though not illustrated in FIG. 2, the value of the time constant is fixed to zero in the range in which the change amount per predetermined time of the target intake air quantity KLT exceeds a certain threshold value. More specifically, if the target intake air quantity KLT changes significantly to a certain degree, the change speed of the throttle opening TA is not lessened.

Figure 3:
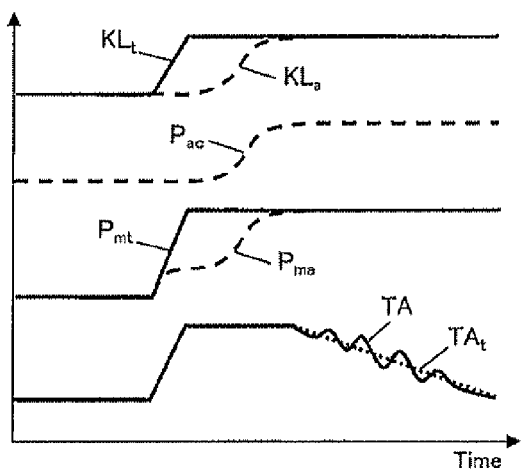
FIG. 3 is a diagram for explaining an effect by the control device of the embodiment of the present invention.
Figure 4:
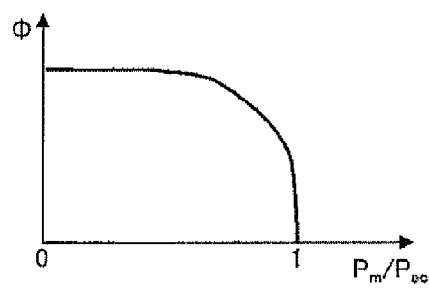
FIG. 4 is a diagram showing a relation which is established between a pressure ratio term $\phi$ and a pressure ratio $P_m/P_{ac}$ of a formula of throttling.

According to the control device of the present embodiment which is configured as above, the control result as shown by the charts in FIG. 3 can be obtained. In the chart of the uppermost stage of FIG. 3, respective changes with time of the target intake air quantity KLT and an actual intake air quantity KLA are shown. In the chart of the second stage, the change with time of the supercharging pressure $P_{ac}$ which is a throttle upstream pressure is shown. In the chart of the third stage, respective changes with time of the target intake pipe pressure $P_{mt}T$ and the estimated intake pipe pressure $P_mA$ are shown. In the chart of the lowermost stage, respective changes with time of the throttle opening TA which is calculated with the throttle inverse model M3 and the final target throttle opening TAT are shown. As shown in the drawing, when the throttle is opened, and the supercharging pressure $P_{ac}$ rises, the value of the throttle opening TA which is calculated with the throttle inverse model M3 becomes oscillatory. This is because the value of the pressure ratio term $\phi$ of formula (2) changes sharply with respect to the very small change of the pressure ratio $P_m/P_{ac}$ due to the influence of the sensor noise or the like. However, according to the control device of the present embodiment, the switch SW is switched in such a region to use the throttle opening TA the change speed of which is lessened by the low-pass filter LPF as the target throttle opening TAT. Thereby, change of the throttle opening can be intentionally suppressed, and occurrence of hunting is prevented.

Meanwhile, in the region in which the change of the value of the pressure ratio term $\phi$ with respect to a very small change of the pressure ratio $P_m/P_{ac}$ is not large, the original throttle opening TA which is not processed in the low-pass filter LPF is directly used as the target throttle opening TAT. More specifically, in the region in which hunting of the throttle hardly occurs, intentional suppression of change of the throttle opening is not performed. Thereby, the target intake air quantity KLT can be realized with excellent precision by appropriate control of the throttle opening.

Furthermore, according to the control device of the present embodiment, the low-pass filter LPF has the time constant thereof made smaller as the change amount per predetermined time of the target intake air quantity KLT is larger. Thereby, even when the value of the pressure ratio $P_m/P_{ac}$ is close to 1, if the target intake air quantity KLT changes sharply, the degree of lessening of the change speed of the throttle opening TA is made small. When the target intake air quantity KLT changes sharply, the throttle opening TA also changes sharply in one direction in correspondence with that. Accordingly, hunting of the throttle hardly occurs even if the change speed of the throttle opening TA is not lessened. Further, by not lessening the change speed of the throttle opening TA, the target intake air quantity KLT which sharply changes can be realized with excellent precision. More specifically, the time constant of the low-pass filter LPF is determined in accordance with the change amount per predetermined time of the target intake air quantity KLT, whereby compatibility of prevention of hunting of the throttle and realization precision of the target intake air quantity KLT are realized.

The above is the description of the embodiment of the present invention. However, the present invention is not limited to the aforementioned embodiment, and can be carried out by variously modified within the range without departing from the gist of the present invention. For example, in the aforementioned embodiment, the low-pass filter is used as the means which lessens the change speed of the throttle opening TA, but so-called moderation processing may be used. As one example of the moderating processing, weighted average can be cited.

Further, the change speed of the throttle opening TA may be lessened by multiplying the change amount of the throttle opening TA which is calculated in the throttle inverse model M3 by a constant gain. The magnitude of the gain in this case is preferably changed in accordance with the change amount per predetermined time of the target intake air quantity KLT. More specifically, as the change amount per predetermined time of the target intake air quantity KLT is larger, the value of the gain is preferably made closer to 1. Further, in the range in which the change amount per predetermined time of the target intake air quantity KLT exceeds a certain threshold value, the value of the gain may be fixed to 1.

Further, the internal combustion engine with a supercharger to which the control device of the present invention is applied may be an internal combustion engine which includes a mechanical supercharger which drives a compressor disposed in the intake passage by the drive force which is taken out from the output shaft of the internal combustion engine.

| Description of Reference Numerals | |
|---|---|
| M1 | Intake valve inverse model |
| M2 | Intake pipe inverse model |
| M3 | Throttle inverse model |
| M4 | Intake system model |
| SW | Switch |
| LPF | Low-pass filter |

The invention claimed is:

1. A control device for an internal combustion engine with a supercharger including an intake passage which introduces air taken in from an outside into a cylinder, a compressor which is disposed in the intake passage, a throttle which is disposed in the intake passage downstream of the compressor, and an intake valve which is disposed in a connection portion of the intake passage and the cylinder, the control device comprising:
   throttle passing flow rate calculating means that calculates a throttle passing flow rate which is necessary for realization of a target intake air quantity;
   throttle upstream pressure acquiring means that acquires a throttle upstream pressure which is a pressure of air in the intake passage from the compressor to the throttle;
   throttle downstream pressure acquiring means that acquires a throttle downstream pressure which is a pressure of air in the intake passage from the throttle to the intake valve;
   throttle opening calculating means that calculates a throttle opening necessary for realization of the throttle passing flow rate by using a formula of throttling with a ratio of the throttle upstream pressure and the throttle downstream pressure as a parameter;
   change speed lessening means that processes a signal of the throttle opening which is calculated in the throttle opening calculating means and lessens a change speed thereof;
   target throttle opening determining means that determines the throttle opening the change speed of which is lessened by the change speed lessening means as a target throttle opening when all of predetermined lessening conditions are satisfied, and determines the throttle opening which is calculated by the throttle opening calculating means as a target throttle opening when the lessening conditions are not satisfied; and
   throttle control means that controls an operation of the throttle in accordance with the target throttle opening,
   wherein the lessening conditions include that magnitude of a deviation of a value of the pressure ratio with respect to 1 is not larger than a predetermined value.

2. The control device for an internal combustion engine with a supercharger according to claim 1,
   wherein the lessening conditions further include that a change amount per predetermined time of the target intake air quantity is not more than a predetermined value.

3. The control device for an internal combustion engine with a supercharger according to claim 1,
   wherein the change speed lessening means processes a signal of the throttle opening which is calculated in the throttle opening calculating means by a low-pass filter, and makes a time constant of the low-pass filter smaller as the change amount per predetermined time of the target intake air quantity is larger.

4. The control device for an internal combustion engine with a supercharger according to claim 2,
   wherein the change speed lessening means processes a signal of the throttle opening which is calculated in the throttle opening calculating means by a low-pass filter, and makes a time constant of the low-pass filter smaller as the change amount per predetermined time of the target intake air quantity is larger.

5. A control device for an internal combustion engine with a supercharger including an intake passage which introduces air taken in from an outside into a cylinder, a compressor which is disposed in the intake passage, a throttle which is disposed in the intake passage downstream of the compressor, and an intake valve which is disposed in a connection portion of the intake passage and the cylinder, the control device comprising:
   a calculator that is programmed to:
   calculate a throttle passing flow rate which is necessary for realization of a target intake air quantity;
   acquire a throttle upstream pressure which is a pressure of air in the intake passage from the compressor to the throttle;
   acquire a throttle downstream pressure which is a pressure of air in the intake passage from the throttle to the intake valve;
   calculate a throttle opening necessary for realization of the throttle passing flow rate by using a formula of throttling with a ratio of the throttle upstream pressure and the throttle downstream pressure as a parameter;
   process a signal of the calculated throttle opening to lessen a change speed thereof; and
   determine the throttle opening the change speed of which is lessened as a target throttle opening when all of predetermined lessening conditions are satisfied, and determine the throttle opening the change speed of which is not lessened as a target throttle opening when the lessening conditions are not satisfied; and
   a controller that is programmed to control an operation of the throttle in accordance with the target throttle opening,
   wherein the lessening conditions include that magnitude of a deviation of a value of the pressure ratio with respect to 1 is not larger than a predetermined value.

6. The control device for an internal combustion engine with a supercharger according to claim 5,
   wherein the lessening conditions further include that a change amount per predetermined time of the target intake air quantity is not more than a predetermined value.

7. The control device for an internal combustion engine with a supercharger according to claim 5,
   wherein the calculator is programmed to use a low-pass filter to lessen a change speed of the calculated throttle opening, and make a time constant of the low-pass filter smaller as the change amount per predetermined time of the target intake air quantity is larger.

8. The control device for an internal combustion engine with a supercharger according to claim 6,
   wherein the calculator is programmed to use a low-pass filter to lessen a change speed of the calculated throttle opening, and make a time constant of the low-pass filter smaller as the change amount per predetermined time of the target intake air quantity is larger.

* * * * *